United States Patent [19]

Curnutt

[11] 4,210,344
[45] Jul. 1, 1980

[54] CONTROLLED SHOCK ABSORBER

[76] Inventor: Charles Curnutt, 75992 Baseline, 29 Palms, Calif. 92277

[21] Appl. No.: 6,636

[22] Filed: Jan. 26, 1979

[51] Int. Cl.² ............................................. B60G 25/00
[52] U.S. Cl. ........................................................ 280/709
[58] Field of Search ........ 280/678, 693, 104, 702–714, 280/6.1, 6 H, 672, 690, 688; 180/282; 105/164

[56] References Cited

U.S. PATENT DOCUMENTS

| | | | |
|---|---|---|---|
| 3,243,537 | 3/1966 | Jezek, Jr. | 180/282 X |
| 3,264,008 | 8/1966 | Allinquant | 280/6 H |
| 3,404,899 | 10/1968 | Vogel | 280/693 X |
| 4,145,073 | 3/1979 | McLuckie et al. | 280/702 |
| 4,152,000 | 5/1977 | Meisel, Jr. | 280/6 H |

*Primary Examiner*—John J. Love
*Assistant Examiner*—Norman L. Stack
*Attorney, Agent, or Firm*—Ralph B. Pastoriza

[57] ABSTRACT

A shock absorber itself is of the fluid piston-cylinder type and is provided in combination with a fluid reservoir containing a hydraulic compressible fluid under high pressure. A check valve is connected between the shock absorber cylinder and the reservoir for passing fluid from the cylinder to the reservoir when the pressure of fluid in the cylinder exceeds the high pressure of fluid in the reservoir. A pressure relief valve in turn connects the reservoir to the cylinder and is set to open a controlled amount to thereby control the pressure of fluid in the cylinder. The pressure of fluid in the cylinder determines the force exerted on the piston tending to move it out of the cylinder. Also, this pressure controls the viscosity of the fluid and thus the damping characteristics of the shock absorber. The setting of the pressure relief valve can be made automatically responsive to accerleration and deceleration as well as up and down movements of the vehicle so that the pressure on the piston in the shock absorber is effectively increased to accommodate sudden upward shocks of the wheel and effectively decreased when light loads occur on the wheel as in the case of the rear wheel of a motorcycle during deceleration.

7 Claims, 3 Drawing Figures

CONTROLLED SHOCK ABSORBER

This invention relates generally to shock absorbers for vehicles and more particularly to a controlled shock absorber in which the stiffness characteristics can be varied in accord with certain operating conditions of the vehicle.

BACKGROUND OF THE INVENTION

Conventional shock absorbers are normally of the piston-cylinder type filled with hydraulic fluid and provided with a powerful spring between a first end of the cylinder and an extending end of the piston rod associated with the piston head in the cylinder. The piston head is provided with small bypass passages so that the fluid can move from one side of the piston head to the other upon reciprocating movement of the head resulting from a series of shocks as the vehicle travels along the road. The fluid effectively dampens the vibratory motion to help smooth out the ride.

Normally, shock absorbers of the foregoing type are connected in parallel; that is, across the normally provided coil or leaf type suspension spring for the vehicle. Thus, when the vehicle is travelling on a very smooth road, there will be little action by the shock absorber. On the other hand, when the vehicle rapidly accelerates or decelerates or rounds a curve, relatively large sustained forces are applied to the shock absorber. In the case of the shock absorbers for the rear wheels, under accelerating conditions there will be a large downward load on the shock absorber and it would be desirable in such instances to "stiffen up" the action of the movement of the piston head in the cylinder. On the other hand, when the vehicle is decelerating, the rear shock absorbers will be subject to a relatively light load and to be effective, less "stiffness" would be desirable. It will also be appreciated that when a shock absorber is under a heavy load and the vehicle is passing over a bumpy road so that the piston head in the shock absorber cylinder is moving rapidly back and forth, the piston head will tend to work upwardly towards the top of the shock absorber cylinder and even hit against the cylinder head. This action is prevented or delayed if the pressure and "stiffness" or damping of the piston head can be increased under such heavy loads.

From all of the foregoing, greatly improved action of shock absorbers particularly for motorcycles or racing vehicles could be realized if some means were provided for automatically controlling the fluid pressure and thus the "stiffness" of the shock absorber under certain vehicle operating conditions.

BRIEF DESCRIPTION OF THE PRESENT INVENTION

The present invention contemplates an improved controlled shock absorber wherein means are provided for varying the pressure characteristics of the shock absorber under varying conditions such as rapid acceleration or deceleration, all to the end that the foregoing problems discussed with respect to conventional shock absorbers are overcome.

More particularly, the shock absorber includes a fluid type piston-cylinder structure in combination with a fluid reservoir holding hydraulic fluid under a given high pressure. A check valve is connected between the cylinder and reservoir for passing fluid from the cylinder to the reservoir only when the pressure of fluid in the cylinder exceeds the given high pressure of fluid in the reservoir. A pressure relief valve in turn is connected between the reservoir and cylinder and set to open a controlled amount in accord with certain operating characteristics of the vehicle to control the pressure of fluid in the shock absorbing cylinder and thereby control the shock damping characteristics of the shock absorber.

In a preferred embodiment of the invention, the setting of the pressure relief valve is made automatically responsive to acceleration and deceleration inertial forces generated when the vehicle accelerates and decelerates. In a second embodiment, a mechanical connection to the vehicle throttle is provided to the pressure relief valve to automatically control the setting thereof.

BRIEF DESCRIPTION OF THE DRAWINGS

A better understanding of this invention will be had by now referring to the accompanying drawings in which.

DETAILED DESCRIPTION OF THE INVENTION

Figure 1:
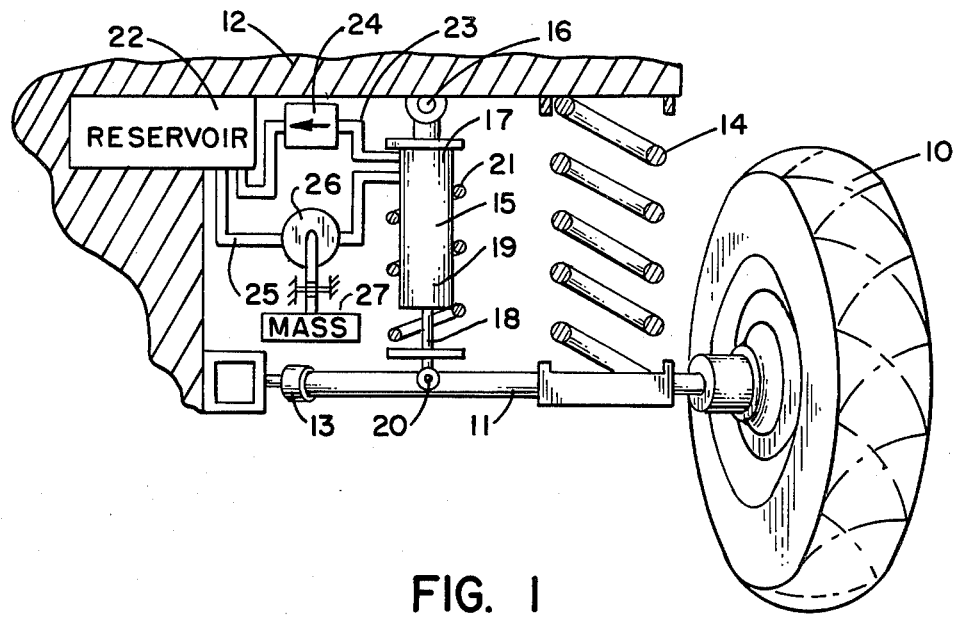
FIG. 1 is a schematic drawing of a vehicle wheel and axle incorporating the shock absorber of this invention, certain parts being shown in cross section.

Referring first to FIG. 1, there is shown a wheel 10 of a vehicle mounted on an axle 11. In the particular embodiment shown for illustrating purposes, the wheel 10 would be the rear wheel of the vehicle. Axle 11 is coupled to the frame 12 as by an appropriate joint 13. A conventional coil suspension spring 14 is shown between the axle 11 and frame 12.

The controlled shock absorber of the present invention is illustrated as of the piston-cylinder type at 15 coupled at 16 to the frame 12 adjacent to a first end 17 of the cylinder. A piston rod 18 extending from the second or lower end 19 of the cylinder in turn is coupled as at 20 to the axle 11. Also shown but not necessary in preferred applications is a powerful spring 21 extending between the first end 17 of the cylinder and an extending portion of the piston 18. Rapid up and down movement of the wheel axle 11 relative to the frame 12 will be damped by the piston-cylinder shock absorber as described when the same is filled with fluid.

Referring to the upper left portion of FIG. 1 there is schematically indicated by the block 22 a reservoir for hydraulic fluid. The fluid in this reservoir is maintained at a given high pressure. A first fluid passage 23 incorporating a checked valve 24 connects between the upper end 17 of the shock absorber cylinder 15 and the reservoir as shown. The direction of the check valve is such that whenever the pressure of fluid in the cylinder 15 exceeds the given high pressure of fluid in the reservoir 22, a fluid flow will take place through the check valve 24.

Also shown schematically in FIG. 1 is a second fluid passage 25 including a pressure relief valve 26 connected between the reservoir 22 and upper end portion 17 of the cylinder 15. The pressure relief valve can be set to open only when a predetermined pressure difference between the pressure of fluid in the reservoir and the pressure of fluid in the cylinder is exceeded. The pressure of the hydraulic fluid in the cylinder is thus determined by the setting of the pressure relief valve.

In the particular example illustrated in FIG. 1, and in accord with an important feature of this invention, the setting of the pressure relief valve 26 can be varied automatically in accord with accelerating and decelerating conditions of the vehicle. Towards this end, there is provided an inertial mass 27 coupled by appropriate levers to the pressure relief valve 26 to thereby control its setting, all as will become clearer as the description proceeds.

Figures 2, 3:
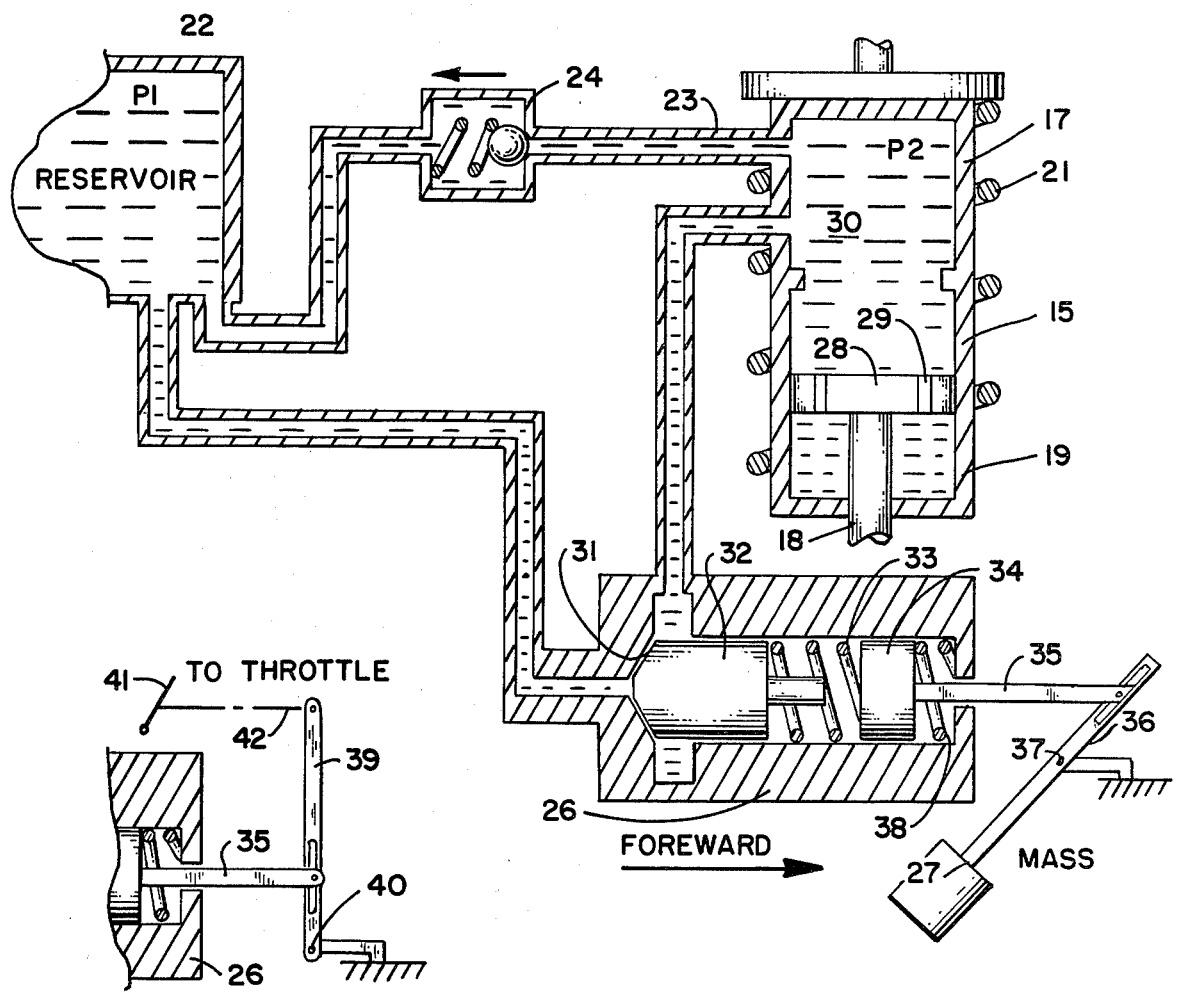
FIG. 2 is a greatly enlarged schematic type diagram partly in cross section of the basic components illustrated in FIG. 1.
FIG. 3 is a fragmentary view of an alternative type control for one of the components illustrated in FIGS. 1 and 2.

Referring now to the enlarged schematic view of FIG. 2, the piston rod 18 from the cylinder 15 is shown connected to a piston head 28 provided with appropriate fluid bypass openings such as indicated at 29. Hydraulic fluid in the shock absorbing cylinder 15 is indicated at 30. Also shown is hydraulic fluid in the reservoir 22. This hydraulic fluid is indicated as at a given high pressure by the symbol P1 in the reservoir. The pressure of the hydraulic fluid in the cylinder 15 is indicated at P2. The hydraulic fluid itself comprises, by way of example, a mixture of nitrogen and oil resulting in an essentially compressible fluid. The mixture is maintained in a relatively homogeneous state by the rapid back and forth flow of fluid between the reservoir 22 and the cylinder 15 resulting from rapid reciprocating movement of the piston head 28 in the cylinder when the vehicle is moving.

Details of the pressure relief valve 26 briefly described in FIG. 1 are shown in the lower portion of FIG. 2. Thus, the second fluid passage 25 from the reservoir enters the pressure relief valve body to define a valve seat 31. A valve head 32 in turn is positioned juxtaposed this seat and arranged to be moved against the seat 31 to close it off completely as by an appropriate spring 33. The compressive force applied by the spring 33 which determines the "setting" of the pressure relief valve; that is, the particular pressure necessary to force the valve head 32 away from the seat 31, is controlled by the position of a spring engaging head 34 longitudinally movable in the valve body 26.

If the head 34 is moved further to the left as viewed in FIG. 2, there will be a greater compressive force exerted by the spring 33 on the valve head 32 thereby requiring a higher pressure to unseat the valve head from the valve seat 31. If the head 34 is moved to the right as viewed in FIG. 2, the compressive force of the spring 33 will be less on the valve head 32 so that less pressure is required to unseat the valve head.

The "setting" of the pressure relief valve 26 is thus determined by the position of the head 34 and this position in turn can be made automatically responsive to certain operating characteristics of the vehicle.

More particularly, the foregoing mentioned "setting" can be made responsive to accelerating and decelerating conditions of the vehicle as by means of the mass 27 briefly described in FIG. 1. In FIG. 2, this mass is coupled to the head engaging the spring 33 as by a head stem 35 coupled to one end of a lever 36. The other end of this lever is secured to the mass 27, the lever being pivoted at an intermediate point 37 to the vehicle frame. With this arrangement, movement of the mass 27 to the right will increase the force applied by the spring 33 against the valve head 32 whereas movement of the mass 27 to the left will retract the head 34 and thus decrease the compressive force applied by the spring.

If the components are so oriented that the mass can swing in a plane corresponding to the direction of motion of the vehicle and if the forward direction of such motion is as indicated by the arrow labeled "Forward" in FIG. 2, the "setting" of the valve 26 is automatically controlled to vary under accelerating and decelerating conditions. A small cushioning spring 38 may be provided between the head 34 and the extreme right end of the valve body 26 as shown.

FIG. 3 shows an alternative automatic control for the setting of the pressure relief valve 26. In this second embodiment, the head stem 35 is coupled to a link 39 pivoted at its lower end to the frame as at 40 and having its upper end connected to the throttle pedal 41 by an appropriate link indicated by the dash-dot line 42.

OPERATION

In operation, and with reference to FIG. 2, the given high pressure of the hydraulic fluid in the reservoir 22 might be, for example, 800 psi. The setting of the pressure relief valve 26 typically would be such that the same would only open under a pressure differential of, for example, 200 psi. Under these conditions, the pressure P2 of hydraulic fluid in the cylinder 15 would be 600 psi. The mixture of nitrogen and oil making up the hydraulic fluid in the cylinder 15 would have a given viscosity under the 600 psi pressure, this viscosity being such as to provide appropriate damping of the movement of the piston head 28 back and forth in the cylinder 15 under cruising conditions of the vehicle.

If the vehicle should be subject to sudden shocks as when going over a ridge or bump in the road, the sudden rapid upward movement of the piston head 28, for example, in the cylinder 15 might momentarily increase the pressure P2 in excess of the given high pressure of 800 psi in the reservoir 22. The check valve 24 is arranged to open whenever the momentary pressure P2 in the cylinder 15 exceeds the given high pressure P1 in the reservoir to pass fluid to the reservoir. If now the motion of the car settles down to a smooth ride, the pressure P2 in the cylinder 15 would drop below the normal 600 psi because of the transfer of fluid to the reservoir. However, the pressure relief valve 26 will open to pass fluid back from the reservoir to the cylinder 15 and thus return the pressure to 600 psi.

From the foregoing, it can be seen that the pressure relief valve 26 essentially will maintain a certain pressure P2 which, in the example given, is 600 psi during normal operating conditions.

If it is assumed that the shock absorber under consideration is for the rear wheel of the vehicle or for the rear wheel of a motorcycle, when the vehicle or motorcycle is accelerating forwardly rapidly, there will be an increased loading on the rear wheel. It would therefore be desirable to "stiffen up" the action of the shock absorber and such can be accomplished by increasing the pressure of the hydraulic fluid 30 in the cylinder 15. This increase in pressure increases the force urging the piston rod out of the cylinder to accommodate the loading.

Thus, referring to the lower portion of FIG. 1 when the vehicle accelerates forwardly, the mass 27 will tend to remain in a stationary position by inertia, thereby resulting in a movement of the mass 27 relative to the vehicle itself to the left. Such movement will move the head 34 against which the spring 33 bears further away from the valve head 32 thereby changing the setting of the pressure relief valve so that the valve head 32 will move away from the seat 31 under a decreased pressure differential between the pressures P1 and P2. For example, if the acceleration is extremely rapid, the setting of the pressure relief valve 26 might be such that only a very small differential pressure is required to open the same so that the pressure P2 in the cylinder 15 approaches the given high pressure of 800 psi in the reservoir 22. This increased pressure will increase the force urging the piston from the cylinder and secondarily the viscosity and damping characteristics of the shock absorber which is desirable under heavy loading. When the vehicle reaches a cruising speed so that it is no longer subject to acceleration, the mass 27 will return to a neutral position so that pressure exerted by the spring 33 on the valve head 32 will be such as to maintain the lower 600 psi pressure in the cylinder 15.

If the vehicle should decelerate rapidly, the loading on the rear wheel will be greatly decreased; that is, it will be relatively light. Under this condition, it is desirable to decrease the "stiffness" of the shock absorber since it is not subject to a heavy load or even a normal load.

Referring once again to the lower portion of FIG. 2, when the vehicle decelerates, the mass 27 will tend to keep moving forwardly relative to the frame so that the lever 36 will move the stem 35 to the left, thereby increasing the compressive force of the spring 33 on the valve head 32 so that a greater pressure differential is required to open the pressure relief valve. The rapid pumping action of the piston 28 in the cylinder 15 as described earlier will result in pressure pulses greater than the 800 psi in the reservoir so that some fluid will be transferred through the check valve 24. However, because of the relatively new high setting of the pressure relief valve 26, this fluid is not replaced so that the net average pressure P2 of fluid in the cylinder 15 is decreased below 600 psi; to a value, for example, of 400 psi. This 400 average psi pressure will be maintained during the deceleration. When the vehicle comes to a stop, the mass 27 will return to a neutral position wherein the valve head 32 will only open under a pressure differential of 200 psi.

A similar action of the pressure relief valve takes place when the setting is controlled by the throttle as schematically indicated in FIG. 3 rather than the inertia of a mass. Thus, when the vehicle is accelerating and the accelerator pedal 41 is depressed, the valve pressure setting will be decreased as a result of movement of the stem 35 to the right as viewed in FIG. 3, so that the pressure relief valve only requires a very small differential pressure to open, thereby increasing the pressure P2 in the cylinder 15. When the operator's foot is completely removed from the accelerator pedal 41 as would be the case when decelerating rapidly, the head stem 35 moves to the left as viewed in FIG. 3 thereby increasing the necessary pressure to operate the pressure relief valve 26 so that the pressure P2 in the cylinder 15 assumes a much lower value, all as described when the same conditions occurred resulting from movement of the mass 27.

When the car is in cruise condition so that the accelerator pedal 41 is in an intermediate position, the setting of the valve 26 is such as to only open under a differential pressure of 200 psi as in the example given.

It will be understood, of course, that at all times the piston head 28 is rapidly moving up and down absorbing small shocks while the vehicle is moving. Pumping action or transfer of fluid between the cylinder 15 and reservoir 22 will only occur in large amounts under a sudden shock which momentarily increases the pressure P2 in the cylinder 15 above that of the pressure of fluid in the reservoir. However, the momentary change in pressure P2 will immediately be compensated by a transfer of fluid back from the reservoir to the cylinder 15 as already described heretofore.

By positioning the axis of lever 36 supporting the mass at 45° when in a neutral position, the inertia of the mass will act in vertical directions as well as in forward and rearward directions so that sudden up and down accelerating and decelerating movements of the vehicle will be accommodated by proper shock absorbing action.

From all of the foregoing, it will thus be seen that the "stiffness" characteristics of the shock absorber are automatically controlled by the setting of the pressure relief valve 26. While a given fixed setting can be provided for any particular vehicle, in certain cases such as motorcycles and racing cars, the automatic setting control by means of an inertial mass or direct linkage to the throttle would be used.

I claim:

1. A controlled shock absorber for positioning between a vehicle frame and axle including, in combination:
   (a) a fluid type piston-cylinder shock absorber including a cylinder coupled to said frame and piston reciprocable therein with fluid bypass means, said piston having a piston rod extending from one end of said cylinder and coupled to said axle;
   (b) a fluid reservoir for holding fluid under a given high pressure;
   (c) a check valve connected between said cylinder and reservoir for passing fluid from said cylinder to said reservoir only when the pressure of fluid in said cylinder exceeds said given high pressure; and
   (d) a pressure relief valve connected between said reservoir and cylinder and set to open a controlled amount to control the pressure of fluid in said cylinder and thereby the force tending to urge the piston from the cylinder.

2. A controlled shock absorber according to claim 1, in which said shock absorber is associated with a rear wheel of said vehicle and wherein means are provided responsive to acceleration and deceleration of said vehicle for respectively opening up further and closing down further said pressure relief valve so that the fluid pressure in said cylinder is increased during acceleration and decreased during deceleration.

3. A controlled shock absorber for positioning between a vehicle wheel axle and frame, including, in combination:
   (a) a cylinder having first and second ends with means at said first end for coupling the cylinder to said frame;
   (b) a piston head in said cylinder having a piston rod extending from said second end of said cylinder with means for coupling said piston rod to said axle;
   (c) hydraulic fluid in said cylinder, said piston head having fluid bypass means so that reciprocating movement of said piston head in said cylinder is damped by said fluid;
   (d) a fluid reservoir for holding hydraulic fluid at a given high pressure;
   (e) a first fluid passage having a check valve connected between said first end of said cylinder and said reservoir so that when the pressure of fluid in said cylinder exceeds said given high pressure, fluid is passed through said first fluid passage and check valve to said reservoir; and (f) a second fluid passage having a pressure relief valve connected between said reservoir and said first end of said cylinder and set to open only when a predetermined pressure difference between the pressure of fluid in said reservoir and the pressure of fluid in said cylinder is exceeded to control the pressure of fluid in said cylinder and thereby the fluid pressure exerted on said piston head and rod tending to urge the rod out of the cylinder.

4. A controlled shock absorber according to claim 3, including means responsive to acceleration and deceleration of said vehicle for adjusting the setting of said pressure relief valve.

5. A controlled shock absorber according to claim 4, in which said means includes an inertial mass; and lever means coupling said mass to said pressure relief valve such that inertial forces from acceleration and deceleration of said vehicle are applied through said lever means to said valve to thereby control said setting.

6. A controlled shock absorber according to claim 5 in which said lever means is mounted at 45° when said mass is in a neutral position so that the inertia of the mass is responsive to acceleration and deceleration in an up and down direction.

7. A controlled shock absorber according to claim 4, in which said means includes link means connecting said pressure relief valve to the throttle control for said vehicle such that operation of said throttle control applies force through said link means to said valve to thereby control said setting.

* * * * *